United States Patent [19]
Sadatoshi et al.

[11] Patent Number: 5,914,363
[45] Date of Patent: *Jun. 22, 1999

[54] CRYSTALLINE ETHYLENE-PROPYLENE COPOLYMER WITH ETHYLENE COPOLYMER(S) AND/OR ALKENYL AROMATIC-GRAFTED RUBBER

[75] Inventors: Hajime Sadatoshi; Kenichi Ohkawa, both of Ichihara; Teruhiko Doi, Sodegaura; Yuichi Miyake, Nagoya; Takao Nomura, Toyota; Takeyoshi Nishio, Okazaki, all of Japan

[73] Assignees: Sumitomo Chemical Company, Limited, Osaka; Toyota Jidosha Kabushiki Kaisha, Toyota, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,280

[22] Filed: Apr. 24, 1996

[30] Foreign Application Priority Data

Apr. 27, 1995 [JP] Japan ................................. 7-104467

[51] Int. Cl.$^6$ ............................ C08K 3/22; C08L 51/04; C08L 53/02
[52] U.S. Cl. ......................... 524/451; 524/504; 524/505; 525/64; 525/88; 525/89
[58] Field of Search ................................. 525/88, 89, 64; 524/451, 505, 504

[56] References Cited

U.S. PATENT DOCUMENTS

| | | | |
|---|---|---|---|
| 5,283,267 | 2/1994 | Nishio et al. | 523/216 |
| 5,308,908 | 5/1994 | Fukui et al. | 524/451 |
| 5,462,987 | 10/1995 | Shinonaga et al. | 525/505 |
| 5,484,824 | 1/1996 | Abe et al. | 523/437 |
| 5,543,454 | 8/1996 | Kamakura et al. | 524/505 |
| 5,723,527 | 3/1998 | Sadatoshi et al. | 524/451 |

FOREIGN PATENT DOCUMENTS

| | | |
|---|---|---|
| 0519725 | 12/1992 | European Pat. Off. |
| 0636650 | 2/1995 | European Pat. Off. |
| 63-277261 | 11/1988 | Japan |
| 1-66263 | 3/1989 | Japan |
| 1-132649 | 5/1989 | Japan |
| 1-168745 | 7/1989 | Japan |
| 5-86256 | 4/1993 | Japan |
| 5-98093 | 4/1993 | Japan |
| 5-98094 | 4/1993 | Japan |

OTHER PUBLICATIONS

WPAT accession No. 93–149349/18 for Japanese Patent No. 5–86256, Sumitomo Chem Co Ltd and Toyota Jidosha KK, Apr. 1993.

WPAT accession No. 93–164637/20 for Japanese Patent No. 5–98094, Sumitomo Chem Co Ltd and Toyota Jidosha KK, Apr. 1993.

WPAT accession No. 93–164636/20 for Japanese Patent No. 5–98093, Sumitomo Chem Co Ltd, Apr. 1993.

*Primary Examiner*—Robert E. Sellers
*Attorney, Agent, or Firm*—Sughrue, Mion, Zinn, Macpeak & Seas, PLLC

[57] ABSTRACT

A thermoplastic resin composition which has a melt flow rate of 25 to 30 g/10 min and a flexural modulus at 23° C. of 20,000 kg/cm$^2$ or more and which comprises (1) 78 to 87% by weight of a specific crystalline polypropylene [referred to hereinafter as (A)] in which the propylene homopolymer portion has a Q value of 3.0 to 5.0, an isotactic pentad fraction of 0.975 or more and an intrinsic viscosity [η] of 1.00 to 1.10 dl/g as measured at 135° C. in tetralin, (2) 3 to 10% by weight of at least two specific rubber components selected from the group consisting of (B) 1 to 9% by weight of an ethylene-butene-1 copolymer rubber, (C) 1 to 9% by weight of an ethylene-propylene copolymer rubber and (D) 1 to 9% by weight of an alkenyl aromatic compound-containing rubber; and (3) 10 to 12% by weight of talc having an average particle diameter of 4 μm or less, and an injection molded article of the thermoplastic resin composition, said thermoplastic resin composition satisfying the impact strength and rigidity required as a material for an interior automotive trim and having a short molding cycle and good surface quality.

13 Claims, No Drawings

CRYSTALLINE ETHYLENE-PROPYLENE COPOLYMER WITH ETHYLENE COPOLYMER(S) AND/OR ALKENYL AROMATIC-GRAFTED RUBBER

BACKGROUND OF THE INVENTION

1. Field of the Invention

This invention relates to a thermoplastic resin composition which is excellent in rigidity and impact resistance in respect of physical properties, has a short molding cycle in respect of injection moldability and is characterized in that its molded article is excellent in surface quality, for example, the molded article has neither flow mark nor weldline and is free from surface strain.

More particularly, it relates to a thermoplastic resin composition which comprises a major amount of a specific crystalline polypropylene and minor amounts of rubber components such as a specific ethylene-butene-1 copolymer rubber and the like and talc and which is excellent in rigidity and impact resistance in respect of physical properties, has a short molding cycle in respect of injection moldability and is excellent in surface quality of its molded article and to an injection-molded article excellent in dimension stability obtained by subjecting the thermoplastic resin composition to injection-molding, in particular, to an injection molded article, particularly for interior automotive trim (door trim, pillar or the like).

2. Prior Art

As a material for interior automotive trim, crystalline propylene-ethylene block copolymers have recently been used from the viewpoint of light weight, low cost and the like. However, conventional interior automotive trims made of a crystalline propylene-ethylene block copolymer are low in impact strength and contain a large amount of inorganic fillers for imparting thereto rigidity and thermal properties such as heat distortion temperature and the like. Therefore, the above interior automotive trims have a considerably large specific gravity.

It has been proposed in, for example, JP-A-53-22552 and JP-A-53-40045 to incorporate an ethylene-propylene copolymer rubber into a crystalline propylene-ethylene block copolymer for improving the impact strength of the latter. However, the crystalline propylene-ethylene block copolymer containing an ethylene-propylene copolymer rubber is inferior in rigidity and thermal properties such as heat distortion temperature and the like. For overcoming this disadvantage, it has been proposed in, for example, JP-A-51-136735, JP-A-53-64256, JP-A-53-64257, JP-A-57-55952, JP-A-57-207730, JP-A-58-17139, JP-A-58-111846, JP-A-59-98157 and JP-B-55-3374 and the like to incorporate an inorganic filler such as calcium carbonate, barium sulfate, mica, crystalline calcium silicate, talc or the like together with the ethylene-propylene copolymer rubber. Also, it is stated that by incorporating talc in JP-A-51-1236735 and by incorporating talc, mica or calcium silicate in JP-A-57-07630, the molding shrinkage can be made smaller and the dimension stability can be improved.

Also, JP-A-58-17139 and JP-A-58-17140 propose to incorporate into the crystalline propylene-ethylene block copolymer an ethylene-butene-1 copolymer rubber in place of the ethylene-propylene copolymer rubber. In particular, JP-A-58-17140, it is stated that as compared with the ethylene-propylene copolymer rubber, the use of an ethylene-butene-1 copolymer rubber can make the impact whitened area small and can improve the resistance to wounding.

The crystalline propylene-ethylene copolymer/ethylene-propylene copolymer rubber/talc composition (referred to hereinafter as the ethylene-propylene copolymer rubber based composition) has been widely used as a material for interior automotive trims and is molded by a conventional injection molding method into interior automotive trims because the ethylene-propylene copolymer rubber based composition is inexpensive and has good moldability. In respect of injection moldability, it is required that firstly the molding cycle of the composition can be shortened to increase the productivity and secondly, when the above composition is subjected to injection molding, there can be given an molded article for interior trim which has such an excellent surface quality that the molded article has neither flow mark nor weldline and is free from surface strain.

However, the conventional ethylene-propylene copolymer rubber based composition can be improved in surface quality in the injection molding by simply enhancing the flow properties; however, the molded article obtained cannot satisfy the impact strength required for the interior trim. On the other hand, though the filling time can be shortened, the plasticizing time becomes longer, so that it has a problem that the molding cycle time is consequently not shortened.

SUMMARY OF THE INVENTION

An object of this invention is to provide a thermoplastic resin composition which comprises a crystalline polypropylene in a major amount, satisfies the impact strength and rigidity required for interior trim, has a better level of brittleness temperature than that of the conventional ethylene-propylene copolymer based rubber composition, and, in respect of the injection moldability, has a short molding cycle and a good surface quality.

Another object of this invention is to provide a thermoplastic resin composition which comprises (A) a crystalline polypropylene, (B) an ethylene-butene-1 copolymer rubber, (C) an ethylene-propylene copolymer rubber, (D) an alkenyl aromatic compound-containing rubber [at least two members selected from (B), (C) and (D) are used] and (E) talc.

A still another object of this invention is to provide an injection molded article obtained by subjecting the above thermoplastic resin composition to injection molding.

Other objects and advantages of this invention will become apparent from the following description.

According to this invention, there is provided a thermoplastic resin composition which has a melt flow rate (JIS-K-6758, 230° C.) of 25 to 30 g/10 min and a flexural modulus at 23° C. of 20,000 kg/cm$^2$ or more and which comprises:

(1) 78 to 87% by weight of a crystalline polypropylene (referred to hereinafter as (A) in some cases) selected from the group consisting of:

(i) a crystalline propylene-ethylene block copolymer composed of a propylene homopolymer portion which is the first segment and a propylene-ethylene random copolymer portion which is the second segment (referred to hereinafter as (A') in some cases), said propylene homopolymer portion having a Q value of 3.0 to 5.0 which is the weight average molecular weight (Mw)/number average molecular weight (Mn) ratio according to a gel permeation chromatography (GPC), an isotactic pentad fraction of 0.975 or more as calculated by $^{13}$C-NMR, and an intrinsic viscosity of 1.00 to 1.10 dl/g as measured at 135° C. in tetralin; said propylene-ethylene random copolymer portion having an intrinsic viscosity of 4.5 to 5.5 dl/g as measured at 135° C. in tetralin and a propylene content/ethylene content ratio of 75/25 to 60/40 (weight % ratio), and (ii) a mixture of the above crystalline propylene-ethylene block copolymer (i) with a crystalline propylene homopolymer having a Q value as defined above of 3.0 to 5.0, an isotactic pentad fraction as calculated by $^{13}$C-NMR of 0.975 or more and an intrinsic viscosity of 0.95 to 1.10 dl/g as measured at 135° C. in tetralin;

(2) 3 to 10% by weight of at least two rubber components selected from the group consisting of:

(B) 1 to 9% by weight of an ethylene-butene-1 copolymer rubber which has a Q value as defined above of 2.7 or less, a butene-1 content of 15 to 20% by weight, an intrinsic viscosity of 1.0 to 2.0 dl/g as measured at 70° C. in xylene and a Mooney viscosity at 100° C. ($ML_{1+4}$ 100° C.) of 7 to 90, (C) 1 to 9% by weight of an ethylene-propylene copolymer rubber which has a Q value as defined above of 2.7 or less, a propylene content of 20 to 30% by weight, an intrinsic viscosity of 0.8 to 2.0 dl/g as measured at 70° C. in xylene and a Mooney viscosity at 100° C. ($ML_{1+4}$ 100° C.) of 5 to 60 and (D) 1 to 9% by weight of an alkenyl aromatic compound-containing rubber in which an alkenyl aromatic compound is grafted to an olefinic copolymer rubber or a conjugated diene rubber and which has an alkenyl aromatic compound content of 1 to 50% by weight; and (3) 10 to 12% by weight of talc having an average particle diameter of 4 μm or less (referred to hereinafter as (E) in some cases), wherein the contents of (A), (A'), (B), (C), (D) and (E) satisfy the following equations 1) to 3):

$$(A)+(B)+(C)+(D)+(E)=100 \quad (1)$$

$$0.13 \leq \{[(A')+(B)+(C)+(D)]/100\} \leq 0.20 \quad (2)$$

$$0.10 \leq \{(A')/[(A')+(B)+(C)+(D)]\} \quad (3).$$

This invention further provides an injection molded article, particularly a molded article for interior automotive trim, obtained by subjecting the above thermoplastic resin composition to injection molding.

DETAILED DESCRIPTION OF THE INVENTION

In this invention, the crystalline polypropylene (A) refers to (i) a crystalline propylene-ethylene block copolymer composed of a crystalline propylene homopolymer portion as the first segment and a propylene-ethylene random copolymer portion as the second segment or (ii) a mixture of the crystalline propylene-ethylene block copolymer (i) with a crystalline propylene homopolymer.

Here, the physical properties, composition and the like required when the crystalline polypropylene (A) is (i) a crystalline propylene-ethylene block copolymer composed of a crystalline homopolymer portion as the first segment and a propylene-ethylene random copolymer portion as the second segment are as follows:

In the crystalline propylene-ethylene block copolymer (i), the Q value which is the weight average molecular weight (Mw)/number average molecular weight (Mn) ratio which indicates the molecular weight distribution according to the gel permeation chromatography (GPC) of the propylene homopolymer portion which is the first segment is 3.0 to 5.0, preferably 3.5 to 4.5. When the Q value is less than 3.0, the flow properties are deteriorated, and when the Q value exceeds 5.0, no preferable results are obtained in respect of molding cycle and surface quality in the injection molding.

The isotactic pentad fraction as calculated by $^{13}$C-NMR is 0.975 or more, preferably 0.980 or more. When the isotactic pentad fraction is less than 0.975, it is difficult to satisfy the desired rigidity, heat resistance and the like.

The intrinsic viscosity $[\eta]_P$ as measured at 135° C. in tetralin of the propylene homopolymer portion is 1.00 to 1.10 dl/g. When the intrinsic viscosity exceeds 1.10 dl/g, the melt flow rate of the composition becomes low, the flow properties are deteriorated, the filling time becomes long, owing to which the molding cycle becomes long, and consequently, no good surface quality is obtained. When the intrinsic viscosity is less than 1.00 dl/g, the tensile elongation and impact strength are low in respect of physical properties, and though good surface quality is obtained in respect of injection moldability, the plasticizing time becomes long and hence the molding cycle becomes long. Consequently, no preferable results are obtained.

Incidentally, the propylene homopolymer portion can be obtained by taking out the reaction product from a polymerizer after the homopolymerization of propylene in the first step of the process for producing the crystalline propylene-ethylene block copolymer (i).

The ethylene content $(C_2')_{EP}$ of the propylene-ethylene random copolymer portion which is the second segment is 25 to 40% by weight, preferably 30 to 35% by weight. When the ethylene content is less than 25% by weight or more than 40% by weight, no preferable results are obtained in respect of the impact resistance of the composition. When the intrinsic viscosity $[\eta]_{EP}$ of the propylene-ethylene random copolymer portion is preferably 4.5 to 5.5 dl/g, more preferably 4.8 to 5.3 dl/g. When it is less than 4.5 dl/g, flow mark is generated during the injection molding and when it is more than 5.5 dl/g, granular structure is formed and no preferable results are obtained in respect of the surface quality.

The physical properties, composition and the like of the crystalline propylene homopolymer required when the crystalline polypropylene (A) is (ii) a mixture of the above crystalline propylene-ethylene block copolymer (i) with the crystalline propylene homopolymer are as follows:

Similarly to the propylene homopolymer portion of the above crystalline propylene-ethylene block copolymer (i), the Q value of the crystalline propylene homopolymer which Q value is the weight average molecular weight (Mw)/number average molecular weight (Mn) ratio which indicates the molecular weight distribution according to GPC is 3.0 to 5.0, preferably 3.5 to 4.5, and the isotactic pentad fraction as calculated by $^{13}$C-NMR of the crystalline porpylene homopolymer is 0.975 or more, preferably 0.980 or more. Also, the intrinsic viscosity as measured at 135° C. in tetralin of the crystalline propylene homopolymer is 0.95 to 1.10 dl/g.

Next, methods for measuring the above various physical properties are explained. The isotactic pentad fraction is the fraction of propylene monomer unit existing at the center of the isotactic chain in the form of a pentad unit, in other words, the chain in which five propylene monomer units are successively meso-bonded, in the crystalline polypropylene molecular chain as measured by the method disclosed by A. Zambelli et al. in Macromolecules, 6, 925 (1973), namely by use of $^{13}$C-NMR. However, the assignment of NMR absorption peak is determined according to the method proposed in Macromolecules, 8, 687 (1975) published thereafter.

Specifically, the isotactic pentad fraction is measured as an area fraction of mmmm peak in the total absorption peak in the methyl carbon region of the $^{13}$C-NMR spectrum. When the isotactic pentad fraction of the NLP standard substance CRM No. M19-14 Polypropylene PP/MWD/2 of NATIONAL PHYSICAL LABORATORY in U.K. was measured by this method, it was 0.944.

In the crystalline propylene-ethylene block copolymer (i), the weight ratio X of the propylene-ethylene random copolymer portion to the total block copolymer can be determined by calculation from the following equation by measuring the quantity of heat of fusion of crystal of each of the crystalline propylene homopolymer portion and the total block copolymer:

$$X = 1 - (\Delta Hf)_T/(\Delta Hf)_P$$

wherein $(\Delta Hf)_T$ is the quantity of heat of fusion of the total block copolymer (cal/g) and $(\Delta Hf)_P$ is the quantity of heat of fusion of the crystalline propylene homopolymer portion (cal/g).

The ethylene content of the propylene-ethylene random copolymer portion can be determined by calculation from the following equation by measuring the ethylene content (% by weight) of the total block copolymer by the infrared absorption spectrum method:

$$(C_2')_{EP} = (C_2')_T/X$$

wherein $(C_2')_T$ is the ethylene content (% by weight) of the total block copolymer and $(C_2')_{EP}$ is the ethylene content (% by weight) of the propylene-ethylene random copolymer portion.

Moreover, in the crystalline propylene-ethylene block copolymer (i), the intrinsic viscosity $[\eta]_{EP}$ of the propylene-ethylene random copolymer portion as measured at 135° C. in tetralin can be determined by calculation from the following equation by measuring the intrinsic viscosity of each of the crystalline propylene homopolymer portion and the total block copolymer:

$$[\eta]_{EP} = [\eta]_T/X - (1/X - 1)[\eta]_P$$

herein $[\eta]_P$ is the intrinsic viscosity (dl/g) of the crystalline propylene homopolymer portion and $[\eta]_T$ is the intrinsic viscosity (dl/g) of the total block copolymer.

When the composition is employed in uses in which impact resistance is particularly required, the crystalline polypropylene is preferably a crystalline propylene-ethylene block copolymer composed of a crystalline propylene homopolymer portion which is the first segment produced by polymerization in the first step and a propylene-ethylene random copolymer portion which is the second segment produced by polymerization in the second step.

Said block copolymer can be produced by a slurry polymerization method, a gas phase polymerization method or the like. When the composition is employed in uses in which particularly high impact resistance is required, it is necessary to increase the amount of the second segment and this segment is suitably produced by a gas phase polymerization method.

The high impact block copolymer produced by the gas phase polymerization method can be produced by the method illustrated in, for example, JP-A-61-287917, namely, a method which comprises homopolymerizing propylene or copolymerizing ethylene or an α-olefin having 4 to 6 carbon atoms with propylene so that the content of ethylene or the α-olefin in the copolymer produced in said step becomes 6 mole % or less, in the presence of a catalyst consisting essentially of a solid catalyst component containing at least titanium, chlorine and an electron donating compound and an organoaluminum compound and if necessary an electron donating compound in liquefied propylene or in a gas phase in the first step, and then, in the second step, in a gas phase, homopolymerizing ethylene or copolymerizing ethylene and propylene and if necessary an α-olefin having 4 to 6 carbon atoms so that the ethylene content in the copolymer produced in the second step becomes 10 mole % or more and the amount of the polymer produced in the second step becomes 10 to 70% by weight based on the total weight of the polymer produced in the first and second steps.

In the case of the slurry polymerization method, the amount of the second segment is preferably in the range of 10 to 30% by weight and, in the case of the gas phase polymerization method, it is preferably in the range of 10 to 70% by weight.

In the case of the gas phase polymerization method, a crystalline propylene-ethylene block copolymer having a larger amount of the second segment can be produced by the method illustrated in JP-A-1-98604, namely, a method in which using a catalyst system consisting of a solid catalyst component containing at least titanium, chlorine and an electron-donating compound; an organoaluminum compound; and an electron-donating compound, an isotactic polypropylene is obtained by polymerization in liquefied propylene or in a gas phase in the first step, and subsequently, in the second step, ethylene and an α-olefin are random-copolymerized in a gas phase so that the ethylene content in the copolymer produced in the second step becomes 15 to 90 mole % and the amount of the polymer produced in the second step becomes 60 to 97% by weight based on the weight of the total polymer produced in the first and second steps. The resulting resin composition can suitably be employed in uses in which super high impact resistance is required.

The ethylene-butene-1 copolymer rubber (B) in this invention is a random copolymer of ethylene and butene-1, and the butene-1 content in the ethylene-butene-1 copolymer rubber (B) is 15 to 20% by weight, preferably 16 to 19% by weight, more preferably 17 to 18% by weight. When the butene-1 content is less than 15% by weight, no preferable results are obtained in respect of impact resistance, and when the butene-1 content is more than 20% by weight, no preferable results are obtained in respect of surface hardness.

The Q value according to GPC of the ethylene-butene-1 copolymer rubber (B) is 2.7 or less, preferably 2.5 or less, and the intrinsic viscosity as measured at 70° C. in xylene and the Mooney viscosity at 100° C. ($ML_{1+4}$ 100° C.) of the ethylene-butene-1 copolymer rubber (B) are 1.0 to 2.0 dl/g and 7 to 90, respectively, preferably 1.2 to 2.0 dl/g and 10 to 80, respectively. When the Q value is more than 2.7 the surface hardness becomes low, and hence, such Q value is not desirable. When the intrinsic viscosity as measured at 70° C. in xylene is less than 1.1 dl/g and the Mooney viscosity at 100° C. ($ML_{1+4}$ 100° C.) is less than 7, no preferably results are obtained in respect of impact strength, and when they are more than 2.0 dl/g and more than 90, respectively, the dispersion of the ethylene-butene-1 copolymer rubber in the crystalline polypropylene (A) is inferior and no preferable results are obtained in respect of impact strength.

The ethylene-propylene copolymer rubber (C) in this invention is a random copolymer rubber of ethylene and propylene or an ethylene-propylene-non-conjugated diene copolymer rubber, and the propylene content in the ethylene-propylene copolymer rubber is 20 to 30% by weight, preferably 22 to 28% by weight. When the propylene content is less than 20% by weight, no preferable results are obtained in respect of impact strength, and when the propylene content is more than 30% by weight, no preferable results are obtained in respect of surface hardness. When the ethylene-propylene-non-conjugated diene copolymer rubber is used, the content of the non-conjugated diene in the rubber is preferably adjusted to 7% by weight or less. When the content of the non-conjugated diene exceeds 7% by weight, gelation is caused in the kneading and hence such an amount is not desirable.

The Q value according to GPC of the ethylene-propylene copolymer rubber is 2.7 or less, preferably 2.5 or less, and the intrinsic viscosity as measured at 70° C. in xylene and the Mooney viscosity at 100° C. ($ML_{1+4}$ 100° C.) of the ethylene-propylene copolymer rubber are 0.8 to 2.0 dl/g and 5 to 60, respectively, preferably 1.0 to 1.8 dl/g and 10 to 50, respectively.

When the Q value exceeds 2.7, the surface hardness becomes low and hence such a Q value is not desirable. When the intrinsic viscosity as measured at 70° C. in xylene is less than 0.8 dl/g and the Mooney viscosity at 100° C. ($ML_{1+4}$ 100° C.) is less than 5, no preferable results are obtained in respect of surface hardness and impact strength. When they are more than 2.0 dl/g and more than 60, respectively, the dispersion of the ethylene-propylene copolymer rubber (C) in the crystalline polypropylene (A) becomes inferior and no preferable results are obtained in respect of impact strength.

The alkenyl aromatic compound-containing rubber (D) in this invention is a rubber in which an alkenyl aromatic compound is grafted to an olefinic copolymer rubber or a conjugated diene rubber by polymerization, reaction or the like and includes, for example, block or random copolymer rubbers such as styrene-butadiene rubber (SBR), styrene-butadiene-styrene rubber (SBS), styrene-isoprene-styrene rubber (SIS) and the like; hydrogenation products of these block or random copolymer rubbers; and the like. Also, there can be suitably used rubbers obtained by reacting an alkenyl aromatic compound such as styrene or the like with an ethylene-propylene-non-conjugated diene rubber (EPDM).

The content of the alkenyl aromatic compound in the alkenyl aromatic compound-containing rubber is 1 to 50% by weight, preferably 5 to 40% by weight, more preferably 10 to 30% by weight.

In this invention, the content of the crystalline polypropylene (A) in the final composition is 78 to 85% by weight. Also, in the final composition, there must be used at least two members selected from the group consisting of the ethylene-butene-1 copolymer rubber (B), the ethylene-propylene copolymer rubber (C) and the alkenyl aromatic compound-containing rubber (D). When only one member selected from the components (B), (C) and (D) is used, it is difficult to exhibit the desired effect.

The content of each of the components (B), (C) and (D) in the final composition is 1 to 9% by weight and the total content of the components (B) to (D) is 3 to 10% by weight, preferably 4 to 8% by weight. Moreover, when the content of the second segment (A') in the crystalline propylene-ethylene block copolymer (A) is taken into consideration, the contents of (A), (A'), (B), (C), (D) and (E) and the total content of (A') and (B) to (D) [(A')+(B) to (D)] must satisfy the following equations:

$$(A)+(B)+(C)+(D)+(E)=100 \tag{1}$$

$$0.13 \leq \{[(A')+(B)+(C)+(D)]/100\} \leq 0.20 \tag{2}$$

$$0.10 \leq \{(A')/[(A')+(B)+(C)+(D)]\} \tag{3}$$

When the total content of (A')+(B) to (D) is smaller than the lowest value satisfying the above three equations, no preferable results are obtained in respect of impact strength and when it is larger than the highest value satisfying the above three equations the flow properties of the composition become inferior.

The average particle diameter of talc (E) used in this invention is not more than 4 μm, preferably not more than 3μ. When the average particle diameter is more than 4 μm, the impact strength is greatly lowered and the appearance including gloss and the like becomes inferior. Untreated talc may be used as it is; however, for the purpose of improving the interfacial adhesiveness to the polypropylene resin and also improving the dispersibility it is possible to use talc surface-treated with a silane-coupling agent, a titanium-coupling agent, a higher fatty acid, a higher fatty acid ester, a higher fatty acid amide, a higher fatty acid salt or another surfactant which are usually known.

The term "average particle diameter of talc" used herein means the 50% particle diameter D50 determined from the integrated distribution curve of an undersize particle method obtained by suspending talc particles in a dispersion medium such as water, alcohol or the like and measuring the particle diameters by means of a centrifugal sedimentation type particle size distribution measuring instrument.

Incidentally, the talc content in the final composition is 10 to 12% by weight. When the talc content is less than 10% by weight, no preferable results are obtained in respect of rigidity, and when it exceeds 12% by weight, the brittleness temperature is lowered.

As the specific physical properties of the final composition, it is necessary that the melt flow rate (JIS-K-6758, at 230° C., under a load of 2.16 kg) be 25 to 30 g/10 min and the rigidity be 20,000 kg/cm$^2$ or more in terms of a flexural modulus at 23° C. Moreover, it is desirable that the impact strength is 7 kg·cm/cm or more in terms of an Izod impact strength (notched) at 23° C.; the brittleness temperature is not more than 10° C.; and the heat distortion temperature (HDT) is not less than 70° C.

The thermoplastic resin composition aimed at by this invention can be obtained only when the structure of each of the components used is as specified above and the proportion of each of the components blended is limited to the specific range.

The composition of this invention can be produced by use of a kneader such as a single screw extruder, a twin screw extruder, a Banbury mixer, a heated roll or the like. The necessary components may be mixed at one time or in portions. When the components are added in portions, there can be used a method which comprises kneading the crystalline polypropylene and talc and then adding the ethylene-butene-1 copolymer rubber, the ethylene-propylene copolymer rubber and the alkenyl aromatic compound-containing rubber (referred to hereinafter collectively as the rubbers) or a method which comprises previously kneading talc at a high concentration with the crystalline polypropylene to prepare a master batch and separately kneading, while diluting, the master batch with the crystalline polypropylene, the rubbers and the like. Moreover, as a second method of addition in portions, there are a method which comprises kneading the crystalline polypropylene with the rubbers, then adding talc thereto and kneading them, and a method which comprises previously kneading the rubbers at a high concentration with the crystalline polypropylene to prepare a master batch, then adding thereto the crystalline polypropylene and talc and kneading them. As a third method of addition in portions, there is a method which comprises previously and separately kneading the crystalline polypropylene with talc, and the crystalline polypropylene with the rubbers, and finally combining and kneading the resulting mixtures. In general, the temperature necessary for the kneading is 170–250° C., and the time is 1 to 20 minutes.

Furthermore, in the kneader, in addition to the above essential components, the following additives can be appropriately compounded therewith in the range of the object of this invention: antioxidant, ultraviolet absorber, lubricant, pigment, antistatic agent, copper-pollution-preventing agent, flame retardant, neutralizer, foaming agent, plasticizer, nucleating agent, bubble inhibitor, cross-linking agent and the like.

Incidentally, the thermoplastic resin composition of this invention can be formed into an injection-molded article by a conventional injection molding method. In particular, the thermoplastic resin composition according to this invention is excellent in rigidity and impact strength and good in flow properties, excellent in appearance of molded article such as flow mark, weldline and the like. The thermoplastic resin composition of this invention can be suitably used in the production of an injection molding, particularly an automotive injection-molded article such as door trim, pillar or the like and an instrumental panel.

DESCRIPTION OF THE PREFERRED EMBODIMENTS

This invention is explained in more detail below referring to Examples which are merely illustrative and not limitative.

The methods for measuring physical properties used in the Examples were as follows:

(1) Melt flow rate

According to the method defined in JIS-K-6758. The measurement temperature was 230° C. and the load was 2.16 kg unless otherwise specified.

(2) Flexural test

According to the method defined in JIS-K-7203. A test piece prepared by injection molding was used. The test piece had a thickness of 6.4 mm, and the flexural modulus was evaluated under the conditions of a span of 100 mm and a loading rate of 2.0 mm/min. The measurement temperature was 23° C. unless otherwise specified.

(3) Izod impact strength (Izod Impact)

According to the method defined in JIS-K-7110. A test piece prepared by injection molding was used. The test piece had a thickness of 6.4 mm and was subjected to notch processing and then to evaluation of Izod impact strength (notched). The measurement temperature was 23° C.

(4) Brittleness temperature (B.P.)

According to the method defined in JIS-K-6758. A test piece having a predetermined size of 6.3×38×2 mm was punched out of a flat plate having a size of 5×150×2 mm prepared by injection molding and then evaluated by the above-mentioned method.

(5) Heat distortion temperature (HDT)

According to the method defined in JIS-K-7207. A fiber stress was measured at 18.6 kg/cm$^2$.

(6) Mooney viscosity ($ML_{1+4}$ 100° C.)

According to the method defined in JIS-K-6300. The measurement temperature was 100° C.

(7) Ethylene content, propylene content and butene-1 content

The ethylene or propylene content appearing in the infrared absorption spectrum obtained by preparing a press sheet and subjecting the same to measurement was evaluated by a calibration curve method using the absorbance of characteristic absorption of methyl group (—$CH_3$) or methylene group (—$CH_2$—) and the butene-1 content was evaluated by a calibration curve method using the absorbance of characteristic absorption of ethyl group.

(8) Intrinsic viscosity ($[\eta]$)

Using an Ubbellohde viscometer, a reduced viscosity was measured at concentrations of 0.1, 0.2 and 0.5 g/dl to obtain three values. The intrinsic viscosity was determined by the calculation method stated in "Kobunshi Yoeki, Kobunshi Jikkengaku 11" (published by Kyoritsu Shuppan Kabushiki Kaisha in 1982), page 491, namely, an extrapolation method which comprises plotting the reduced viscosities to the concentrations and extrapolating the viscosity at a concentration of zero.

The crystalline polypropylene was evaluated using tetralin as a solvent at a temperature of 135° C. The ethylene-butene-1 copolymer rubber and the ethylene-propylene copolymer rubber were evaluated using xylene as a solvent at a temperature of 70° C.

(9) Molecular weight distribution (Q value)

Measured by a gel permeation chromatography (GPC) under the following conditions:

(a) Crystalline polypropylene

GPC: 150C Model manufactured by Water Company

Column: Two Shodex 80 MA columns manufactured by Showa Denko K. K.

Amount of sample: 300 μl (polymer concentration: 0.2 % by weight)

Flow rate: 1 ml/min

Temperature: 135° C.

Solvent: o-Dichlorobenzene

Using a standard polystyrene prepared by TOSOH CORP., a calibration curve relating to eluate volume and molecular weight was prepared and the polystyrene-reduced weight average molecular weight and polystyrene-reduced number average molecular weight of a test sample were determined using the calibration curve, and thereafter, a Q value (=weight average molecular weight/number average molecular weight) was determined therefrom as a measure for molecular weight distribution.

(b) Ethylene-butene-1 copolymer rubber and ethylene-propylene copolymer rubber

GPC: 150C Model manufactured by Waters Company

Column: One Shodex 80 MA column manufactured by Showa Denko K. K.

Amount of sample: 300 μl (polymer concentration: 0.2% by weight)

Flow rate: 1 ml/min

Temperature: 145° C.

Solvent: o-Dichlorobenzene

Using a standard polystyrene prepared by TOSOH CORP., a calibration curve relating to eluate volume and molecular weight was prepared and the polystyrene-reduced weight average molecular weight and polystyrene-reduced number average molecular weight of a test sample were determined using the calibration curve, and thereafter, a Q value (=weight average molecular weight/number average molecular weight) was determined therefrom as a measure for molecular weight distribution.

The test pieces for evaluating the physical properties in (2), (3), (4) and (5) above were prepared under the following injection molding conditions unless otherwise specified: The composition was dried at 120° C. for two hours in a hot air drier and thereafter subjected to injection molding at a molding temperature of 220° C. at a mold cooling temperature of 50° C. for an injection time of 15 sec for a cooling time of 30 sec using IS150E-V Model injection machine manufactured by Toshiba Machine Co., Ltd.

The following compositions were prepared under the following conditions unless otherwise specified: The predetermined amount of each component was weighed, subjected to uniform pre-mixing by means of a Henschel mixer and a tumbler and thereafter subjected to extrusion by a twin screw extruder (TEX44SS 30BW-2V Model manufactured by THE JAPAN STEEL WORKS, LTD.) at an extrusion rate of 35 kg/hr at 900 rpm under vent suction.

EXAMPLE 1

79% by weight of a propylene-ethylene block copolymer (BC-1), 6% by weight of a propylene homopolymer, 2% by weight of an ethylene-butene-1 copolymer rubber (EBR), 2% by weight of an ethylene-propylene copolymer rubber (EPR) and 11% by weight of talc having an average particle diameter of 2 μm were mixed with various stabilizers, and thereafter, the resulting mixture was kneaded under the predetermined conditions and then injection molded into a test piece. The proportions of the components used are shown in Table 2, and the results of evaluation of physical properties are shown in Table 3.

EXAMPLES 2 TO 4 AND COMPARATIVE EXAMPLES 1 TO 3

In the same manner as in Example 1, the materials shown in Table 1 were subjected to injection molding to prepare test pieces-having the compositions shown in Table 2. The results of evaluation of physical properties are shown in Table 3.

The Examples of this invention are good in balance of and excellent in physical properties including tensile elongation, low temperature Izod impact strength, brittleness temperature and the like as compared with the Comparative Examples.

TABLE 1

| | | P portion | | | | |
|---|---|---|---|---|---|---|
| | | | Isotactic | | EP portion | |
| Sample | Q value | $[\eta]_P$ (dl/g) | pentad fraction | $[\eta]_{EP}$ (dl/g) | Content 1 (%) | Content 2 (%) |
| Polypropylene | | | | | | |
| BC-1 | 4.0 | 1.05 | 0.981 | 5.0 | 15 | 35 |
| PP-1 | 4.1 | 1.00 | 0.982 | — | — | — |
| PP-2 | 4.1 | 1.08 | 0.981 | — | — | — |

| Sample | Q value | $ML_{1+4}$ 100° C. | $[\eta]$ dl/g | Comonomer content (wt. %) |
|---|---|---|---|---|
| Rubber | | | | |
| EBR | 2.0 | 48 | 1.8 | 17 (Butene-1) |
| EPR | 2.0 | 22 | 1.5 | 22 (Propylene) |

TABLE 1-continued

| | MI (g/10 min) | Styrene content (wt. %) |
|---|---|---|
| SEBS | 8 | 13 |
| EPS | — | 30 |

Note:
BC: Propylene-ethylene block copolymer
PP: Propylene homopolymer
EPR: Ethylene-propylene copolymer rubber
EBR: Ethylene-butene-1 copolymer rubber
SEBS: Styrene-ethylene/butene-1-styrene block copolymer
EPS: Styrene grafted EPDM
P portion: Propylene homopolymer portion of BC or whole of PP
EP portion: Propylene-ethylene random copolymer portion of BC
Content 1: Content of EP portion in BC
Content 2: Ethylene content in EP portion

TABLE 2

| | Composition (wt. %) | | | | | | |
|---|---|---|---|---|---|---|---|
| | BC-1 | PP-1 | PP-2 | EBR | EPR | SEBS | EPS | TALC |
| Example 1 | 79 | 6 | — | 2 | 2 | — | — | 11 |
| Example 2 | 83 | — | — | 3 | 3 | — | — | 11 |
| Example 3 | 73 | — | 10 | — | 3 | 3 | — | 11 |
| Example 4 | 73 | — | 10 | — | 3 | 2 | 1 | 11 |
| Comp. Example 1 | 68 | — | 17 | 4 | — | — | — | 11 |
| Comp. Example 2 | 68 | — | 17 | — | 4 | — | — | 11 |
| Comp. Example 3 | 70 | — | 13 | 6 | — | — | — | 11 |

TALC: Talc (Enstal 56 manufactured by Hayashi Kasei K.K.)

TABLE 3

| Unit | Melt flow rate g/10 min. | Specific gravity — | Flexural modulus kg/cm$^2$ | IZOD impact strength kg · cm/cm | HDT ° C. | B.P. ° C. |
|---|---|---|---|---|---|---|
| Example 1 | 26 | 0.97 | 22300 | 7.7 | 76 | 6 |
| Example 2 | 26 | 0.97 | 21400 | 8.6 | 79 | 4 |
| Example 3 | 27 | 0.97 | 21700 | 8.8 | 78 | 3 |
| Example 4 | 27 | 0.97 | 21500 | 9.3 | 76 | 2 |
| Comp. Example 1 | 26 | 0.97 | 21400 | 8.2 | 74 | 11 |
| Comp. Example 2 | 26 | 0.97 | 22800 | 7.1 | 76 | 13 |
| Comp. Example 3 | 26 | 0.97 | 21700 | 8.4 | 76 | 8 |

What is claimed is:

1. An interior automotive trim obtained by injection molding a thermoplastic resin composition which has a melt flow rate (JIS-K-6758, 230° C.) of 25 to 30 g/10 min and a flexural modulus at 23° C. of 20,000 kg/cm$^2$ or more and which consists essentially of:

(1)$^{(A)}$ 78 to 86% by weight of a crystalline polypropylene selected from the group consisting of:
(i) a crystalline propylene-ethylene block copolymer composed of a propylene homopolymer portion which is the first segment and a propylene-ethylene random copolymer portion (1)$^{(A')}$ which is the second segment, said propylene homopolymer portion having a Q value of 3.0 to 5.0, wherein Q is the weight average molecular weight (Mw)/number average molecular weight (Mn) ratio according to gel permeation chromatography, an isotactic pentad fraction of 0.975 or more as calculated by $^{13}$C-NMR, and an intrinsic viscosity of 1.00 to 1.10 dl/g as measured at 135° C. in tetralin; said propylene-ethylene random copolymer portion having an intrinsic viscosity of 4.5 to 5.5 dl/g as measured at 135° C. in tetralin and a propylene content/ethylene content ratio of 75/25 to 60/40 (weight k ratio), and (ii) a mixture of the above crystalline propylene-ethylene block copolymer (i) with a crystalline propylene homopolymer having a Q value of 3.0 to 5.0, an isotactic pentad fraction as calculated by $^{13}$C-NMR of 0.975 or more and an intrinsic viscosity of 0.95 to 1.10 dl/g as measured at 135° C. in tetralin;

(2) 3 to 10% by weight of rubber components consisting of:

(i$^{(D)}$) 1 to 9% by weight of an alkenyl aromatic compound-containing rubber in which an alkenyl aromatic compound is grafted to an olefinic copolymer rubber or a conjugated diene rubber and which has an alkenyl aromatic compound content of 1 to 50% by weight; and (ii) at least one component selected from the group consisting of:

(ii$^{(B)}$) 1 to 9% by weight of an ethylene-butene-1 copolymer rubber which has a Q value of 2.7 or less, a butene-1 content of 15 to 20% by weight, an intrinsic viscosity of 1.0 to 2.0 dl/g as measured at 70° C. in xylene and a Mooney viscosity at 100° C. ($ML_{1+4}$ 100° C.) of 7 to 90, and (ii$^{(C)}$) 1 to 9% by weight of an ethylene-propylene copolymer rubber which has a Q of 2.7 or less, a propylene content of 20 to 30% by weight, an intrinsic viscosity of 0.8 to 2.0 dl/g as measured at 70° C. in xylene and a Mooney viscosity at 100° C. ($ML_{1+4}$ 100° C.) of 5 to 60; and (3)$^{(E)}$- 10 to 12% by weight of talc having an average particle diameter of 4 μm or less, wherein the contents of (1)$^{(A)}$, (1)$^{(A')}$, (2)(ii)$^{(B)}$, (2)(ii)$^{(C)}$, (2)(i)$^{(D)}$ and (3)$^{(E)}$ satisfy the following equations 1) to 3):

$$(1)^{(A)}+(2)(ii)^{(B)}+(2)(ii)^{(C)}+(2)(i)^{(D)}+(3)^{(E)}100= \quad (1)$$

$$0.13 \leq \{(1)^{(A')}+(2)(ii)^{(B)}+(2)(ii)^{(C)}+(2)(i)^{(D)}\}/100 \leq 0.20 \quad (2)$$

$$0.10 \leq \{(1)^{(A')}/(1)^{(A')}+(2)(ii)^{(B)}+(2)(ii)^{(C)}+(2)(i)^{(D)})\} \quad (3).$$

2. The automotive trim according to claim 1, wherein the Q value of the first segment of the component (i) is 3.5 to 4.5.

3. The automotive trim according to claim 1, wherein the isotactic pentad fraction of the first segment of the component (i) is 0.980 or more.

4. The automotive trim according to claim 1, wherein the propylene content/ethylene content of the second segment of the component (i) is 70/30 to 65/35 (weight % ratio).

5. The automotive trim according to claim 1, wherein the intrinsic viscosity [η] of the second segment of the component (i) is 4.8 to 5.3 dl/g as measured at 135° C. in tetralin.

6. The automotive trim according to claim 1, wherein the crystalline propylene homopolymer in the component (ii) has a Q value of 3.5 to 4.5, an isotactic pentad fraction of 0.980 or more.

7. The automotive trim according to claim 1, wherein the ethylene-butene-1 copolymer rubber has a butene-1 content of 16 to 19% by weight, a Q value of 2.5 or less, an intrinsic viscosity of 1.2 to 2.0 dl/g as measured at 70° C. in xylene and a Mooney viscosity at 100° C. ($ML_{1+4}$ 100° C.) of 10 to 80.

8. The automotive trim according to claim 1, wherein the ethylene-propylene copolymer rubber is an ethylene-propylene random copolymer rubber having a propylene content of 22 to 28% by weight or an ethylene-propylene-non-conjugated diene copolymer rubber having a non-conjugated diene content of 7% by weight or less.

9. The automotive trim according to claim 8, wherein the ethylene-propylene copolymer rubber has a Q value of 2.5 or less, an intrinsic viscosity of 0.1 to 1.8 dl/g as measured at 70° C. in xylene and a Mooney viscosity at 100° C. ($ML_{1+4}$ 100° C.) of 10 to 50.

10. The automotive trim according to claim 1, wherein the alkenyl aromatic compound-containing rubber is a block or random copolymer rubber selected from the group consisting of styrene-butadiene rubber, styrene-butadiene-styrene rubber, styrene-isoprene-styrene rubber, and a hydrogenation product of the block or random copolymer rubber.

11. The automotive trim according to claim 1, wherein the alkenyl aromatic compound content of the alkenyl aromatic compound-containing rubber is 5 to 40% by weight.

12. The automotive trim according to claim 1, wherein the alkenyl aromatic compound content of the alkenyl aromatic compound-containing rubber is 10 to 30% by weight.

13. The automotive trim according to claim 1, wherein the talc has an average particle diameter of 3 μm or less.

* * * * *